Dec. 2, 1941.  H. H. WELD ET AL  2,264,780
TOOLING FOR ROTATING WORK
Filed Jan. 10, 1940  4 Sheets-Sheet 4
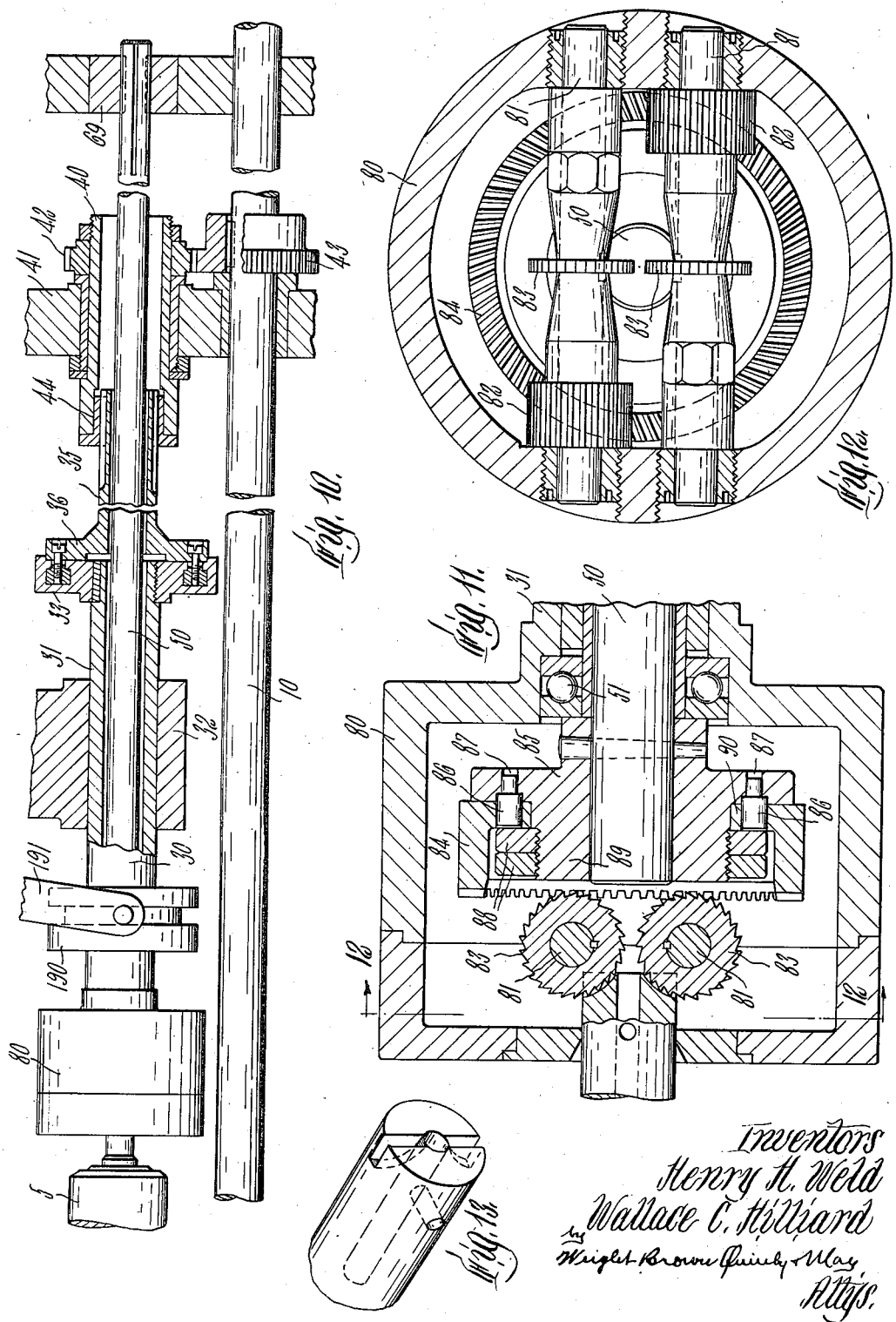

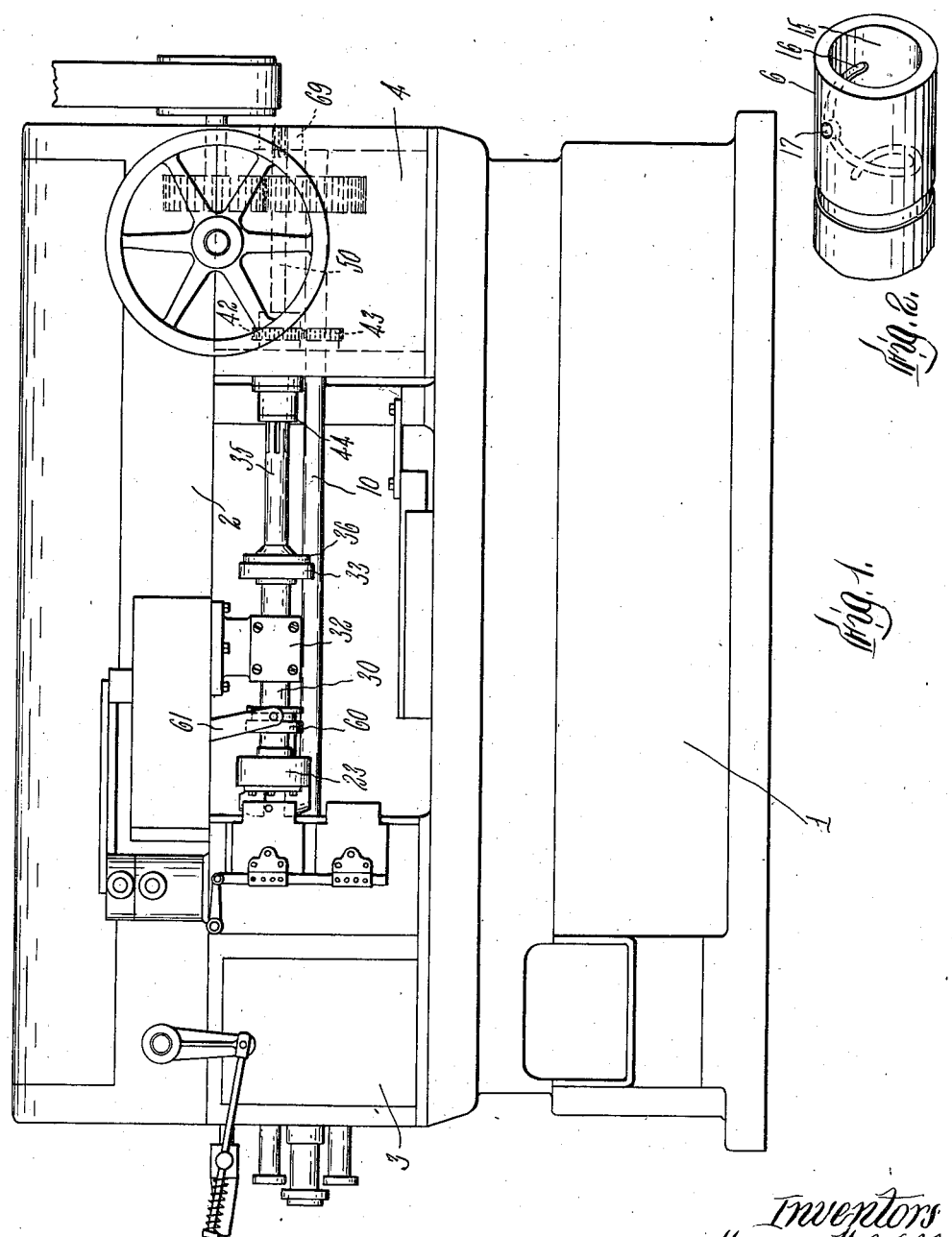

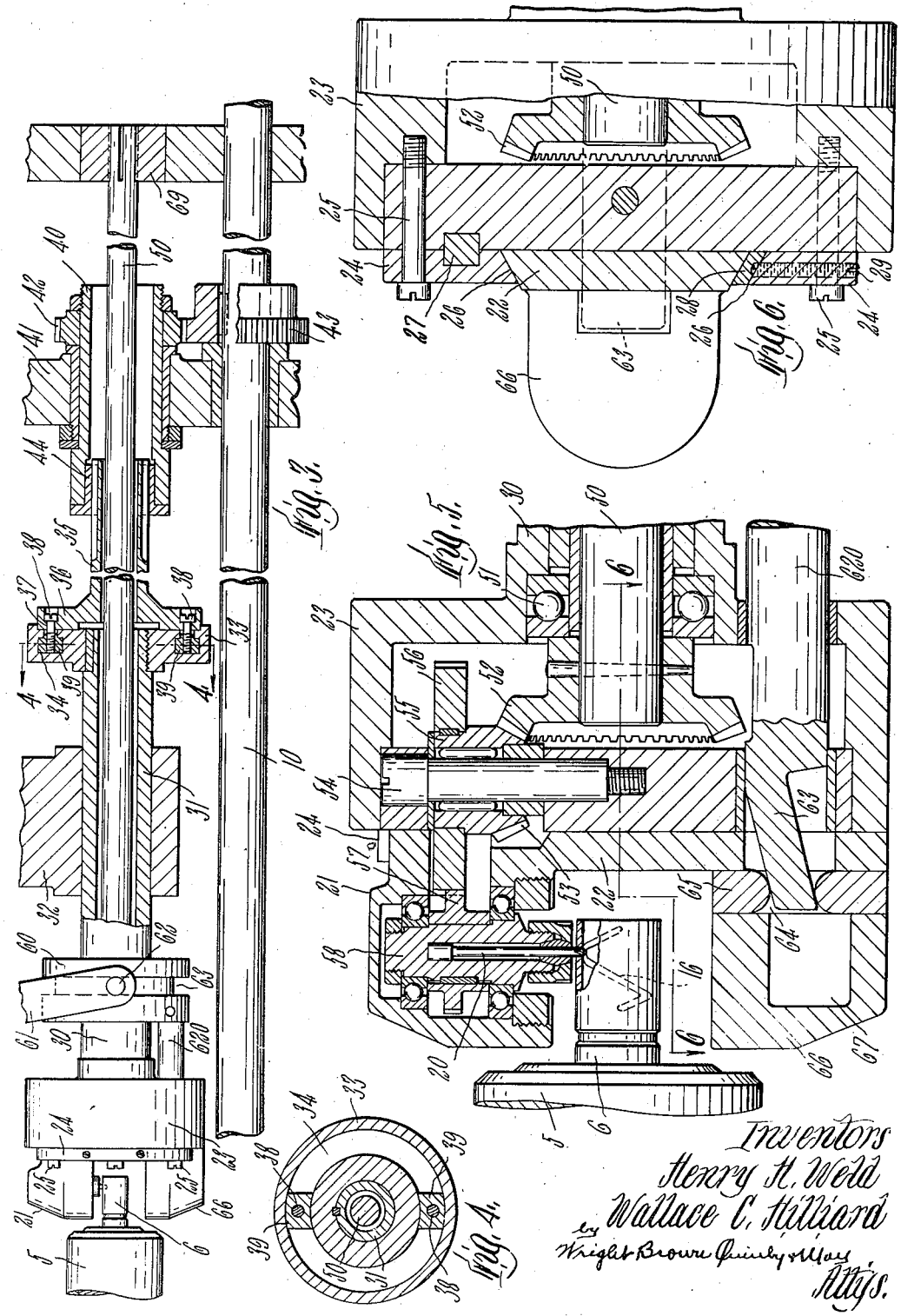

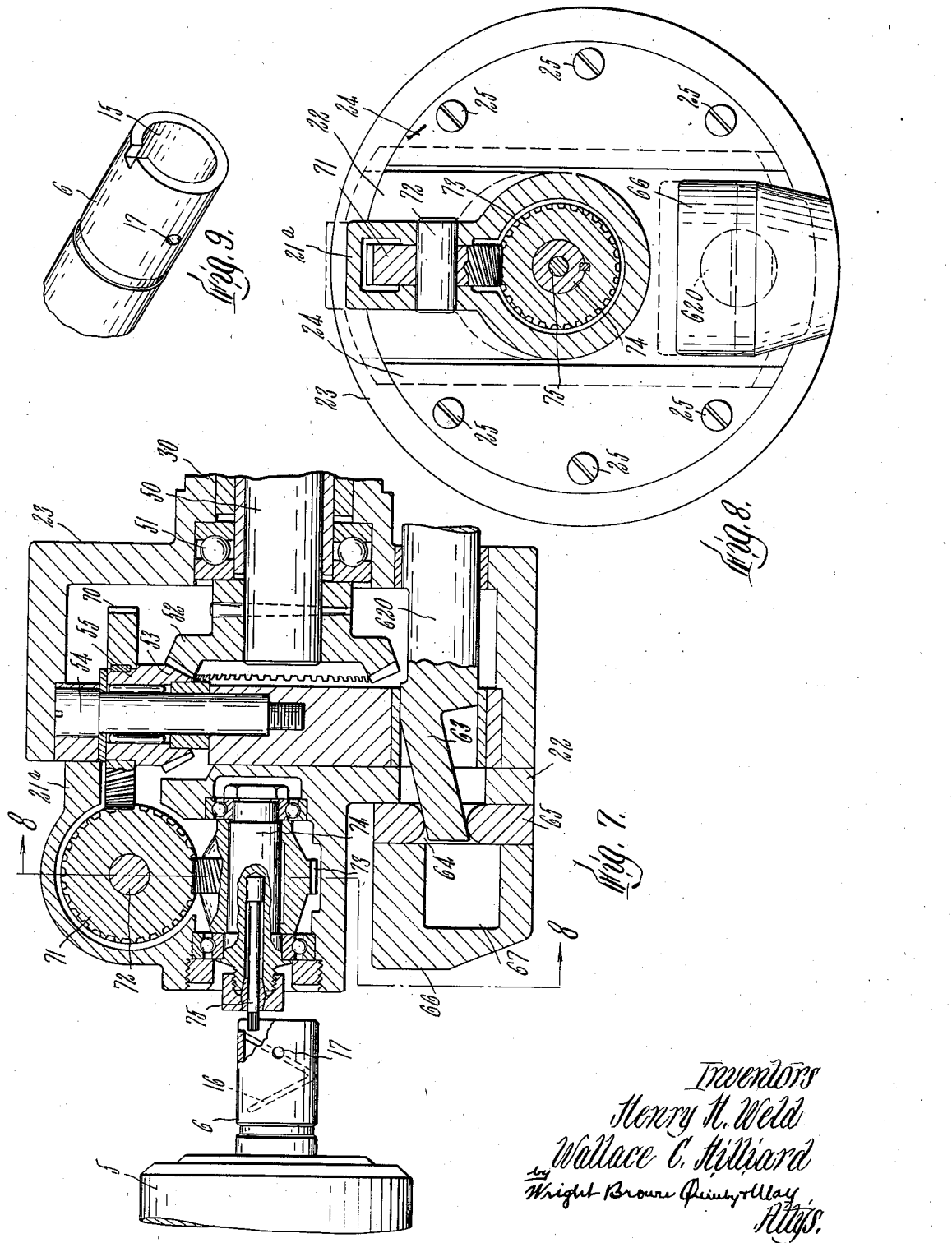

Patented Dec. 2, 1941

2,264,780

UNITED STATES PATENT OFFICE 2,264,780

TOOLING FOR ROTATING WORK

Henry H. Weld and Wallace C. Hilliard, Windsor, Vt., assignors to Cone Automatic Machine Company Inc., Windsor, Vt., a corporation of Vermont Application January 10, 1940, Serial No. 313,212

4 Claims. (Cl. 29—57)

This invention relates to machines having one or more rotary work spindles, and has for an object to perform one or more tooling operations in a definite angular relation to the work axis and while the work is rotating.

A further object is to provide mechanism insuring that the angular tooling operation is performed in definite angular position around the work axis so that it may be properly related to other operations on the same work piece and that in a succession of work pieces the angular operation is performed in the same relation in each piece to other tooling operations or definite angular reference points.

For a more complete understanding of this invention, together with further objects and advantages, reference may be had to the accompanying drawings in which—

Figure 1 is a somewhat diagrammatic front elevation, with many parts omitted, of a multiple spindle lathe showing one embodiment of this invention.

Figure 2 is a fragmentary perspective view of work illustrating an operation which may be performed by the machine of Figure 1.

Figure 3 is a view partly in side elevation and partly in central longitudinal section of the tool operating parts of Figure 1 and embodying the mechanism for one work spindle.

Figure 4 is a detail section on line 4—4 of Figure 3.

Figure 5 is a fragmentary central longitudinal section to a larger scale through the tool head of the mechanism of Figure 3.

Figure 6 is a detail section on line 6—6 of Figure 5.

Figure 7 is a view similar to Figure 5, but showing a mechanism for performing a different operation.

Figure 8 is a section on line 8—8 of Figure 7.

Figure 9 is a fragmentary perspective view of the work showing the operation performed by the mechanism of Figures 7 and 8.

Figure 10 is a view similar to Figure 3, but illustrating a mechanism for performing still another operation.

Figure 11 is a central longitudinal cross section to a larger scale of the tool head of Figure 10.

Figure 12 is a section on line 12—12 of Figure 11.

Figure 13 is a fragmentary perspective view of a work piece showing the operation performed by the mechanism of Figures 10 to 12, inclusive.

Referring first to the construction shown in Figures 1 to 6, in Figure 1 there is shown somewhat diagrammatically a multiple spindle machine of the well known Cone type to which the subject matter of this invention is shown as applied. This machine may, for example, be substantially that shown in the Cone Patent No. 2,142,557 dated January 3, 1939, comprising a lower bed 1, and an upper bed 2 supporting and housing certain of the control mechanisms as is shown in that patent, the upper and lower beds being joined at opposite ends by the frame portions 3 and 4. The frame portion 3 houses an indexing work carrier having a plurality of rotary work spindles for carrying bar or tubular stock projecting from one end of each spindle, when the tooling operations are performed thereon. The forward end of such a work spindle is shown at 5 in Figures 3 and 5 and the work projecting therefrom is illustrated at 6.

The frame portion 4 houses trains of gearing by which the work spindles are rotated and from this mechanism there extends into the work holder a driving shaft 19, this driving shaft being arranged coaxial with the spindle holder or turret and having suitable driving connections to the various spindles by which they are all rotated.

The present invention relates particularly to means for effecting cross tooling operations on the work in definite angular relation to this work. For example, as shown in Figure 2, the work 6 may be provided with a bore 15 provided with a spirally arranged oil groove 16 on its inner face. It may be desired to cross drill this portion of the work to form a hole 17 extending therethrough and opening out on its inner face into the groove 16 and to do this without interrupting the normal rotation of the work as produced by the rotation of its holding spindle.

For the purpose of this invention it may be assumed that the bore 15 and the oil groove 16 have been formed at a previous station or stations of the machine, this invention being concerned with the formation of the hole 17 so angularly positioned that its registry with the groove 16 is assured. To this end, the cross drilling is accomplished by a drill which not only rotates about its own axis, which is transverse to the axis of rotation of the work, but it must also rotate about the axis of the work so that it may remain relatively stationary about this axis as the work rotates. For this purpose there is provided a rotary drill 20 (see Figure 5) which is supported for rotation in a tool carrier 21. This tool carrier is provided with a base portion 22 mounted for sliding motion across the end face of a tool head 23. For this purpose the tool head 23 is shown as provided with guide members 24 secured as by screws 25 to the end face of the tool head 23, and provided with beveled edges 26 for engagement with the matingly beveled side edges of the slide 22. One of these members 24 may be keyed in position as by the key 27, while the other may be provided with an adjustable shim 28 interposed between it and the tool carrier base 22. This shim 28 may be adjusted to take up wear as by the adjusting screws 29.

The head 23 is supported at the forward end of a two part sleeve 30 forming a transmission coupling in the driving connections for rotating the tool about the axis of the work spindle supporting the work on which the tool operates. One portion or section 31 of this sleeve is journaled in a bearing 32 secured to the upper bed 2. At its opposite end this sleeve portion 31 has keyed thereto a flange member 33 provided with an annular T slot 34 opening out on its rear face.

The other sleeve portion or section 35 is provided with a circular flange 36 mating the flange 33 and provided with holes 37 opposite to the T slot 34 through which may be passed bolts 38 engaging in shoes 39 riding within the slot 34. As shown in Figure 4, two of these shoes 39 and bolts 38 are employed, though any desired number might be used. By loosening the bolts 38, the flanges 36 and 33 may be turned to any desired relative angular adjustment in which they may be secured by tightening the bolts 38. Thus the angular relationship between the transverse path of motion of the tool carrier and the sleeve portion 35 may be adjustably determined. This sleeve portion 35 may be driven by the shaft 10, which also rotates the work spindle 5 and at the same rate of speed, so that the angular adjustment of the sleeve section 31 with reference to the sleeve section 35 determines the angular relationship between the work and the transverse path of the drill 20. The parts may be so adjusted, therefore, that the drill 20 will be alined with the oil groove 16. Since all of the spindles are maintained in fixed angular relation by their common driving means, it is thus insured that when the work reaches the station at which the cross drilling is accomplished, the proper angular adjustment having once been made between the two sleeve sections 31 and 35, the tool carrier will be properly positioned for the drilling to be done in proper angular relation to the work for all the pieces of work as they are presented thereto by the indexing of the spindle carrier.

The means for driving the sleeve section 35 from the shaft 10, as shown, comprises a quill 40 journaled in a fixed frame portion 41 and having secured thereto a gear 42 meshing with a gear 43 keyed to the shaft 10. The quill 40 is shown as provided with a keyed thimble 44 within which the sleeve section 35 is keyed for axial motion. This permits lengthwise motion of the sleeve 30, either for adjustment or to present or withdraw the tool head relative to the work as may be desired, but insures rotation of the sleeve section 35 when the quill is rotated.

Means are also provided for rotating the drill about its own axis. Such means, as shown, comprises a shaft 50 which extends through the sleeve 30 and is journaled therein as in the bearing 51 shown in Figure 5. Within the head 23, this shaft 50 has fixed thereto a bevel gear 52. This gear meshes with a bevel pinion 53 journaled on a stub shaft 54 and secured to a hub 55 of this bevel pinion 53 is a gear 56. This gear 56 is a long gear which meshes with a pinion 57 keyed to the drill spindle 58, which, in turn, is journaled in the tool carrier 21.

Means are also provided for producing the motion of the tool carrier transverse to the axis of rotation of the work, and as shown this comprises a grooved collar 60 slidably mounted on the sleeve section 31 and adapted to be moved by swinging of an arm 61 having one or more pins 62 engaging in the groove 63 in the collar and actuated by any suitable mechanism, as, for example, by cams (not shown) on one of the cam drums mounted in the upper bed 2 as is common in machines of this type and as shown in the Cone patent to which reference has been made.

This collar 60 is shown as having secured thereto a bar 620 having a forward cam extremity 63 inclined to its longitudinal axis. This cam portion 63 rides through a slot 64 having rounded ends in a hardened wear piece 65 carried by the tool carriage 21. This carriage may be provided with a housing portion 66 having an opening 67 into which the forward end of the cam 63 may extend when the bar 62 is moved axially toward the tool head. This prevents the entry of chips between the cam portion 63 and its hardened follower plate 65.

The shaft 50 may be held stationary if desired, for this purpose it being shown as keyed into a frame member 69. With this construction the rotation of the sleeve 30 causes a differential motion between the shaft 50 and the tool head 23, carrying the pin 55 around the gear 52 and thus produces the rotation of this gear 56 which drives the drill. Of course, if desired, the shaft 50 could be rotated, so long as there is a differential rotation between it and the sleeve and tool head 23 to cause rotation of the drill.

In Figures 7, 8 and 9 a modified mechanism is shown in which while the feed motion of the tool is arranged transverse to the axis of the work, the rotation of the tool is about an axis parallel to the rotation of the work. The particular operation here intended is to produce a slot in the end of the work by a rotary mill, this slot being arranged in a definite angular relation to other parts, as, for example, the oil groove 16 and the cross drilled hole 17 shown in Figure 2. This mechanism may be applied to the machine at a subsequent station from that employed for the cross drilling, if desired. The modification herein shown over the mechanism of Figures 2 and 3 to 6 consists wholly in the tool head and the tool. Within the tool head 21a the bevel gear 52 secured to the shaft 50 meshes with a bevel pinion 53 journaled on the stub shaft 54, but to the hub 55 of this bevel pinion 53 is secured a spiral gear 70. This meshes with a spiral gear 71 on a cross stub shaft 72, which, in turn, meshes with another spiral gear 73 keyed to the tool shaft 74. This tool shaft 74 carries therein the milling cutter 75, the axis of which is arranged substantially parallel to that of the work 6. The spiral gears 71 and 70 permit the transverse feed motion of the tool carrier 21a while retaining the driving connection from the gear 53. This transverse feed motion may be accomplished by the cam 63 on the bar 620 in the manner previously described.

In Figures 10 to 13 is illustrated a further modification in which the feed of the tool is lengthwise of the work axis rather than crosswise, there being, however, the definite angular positioning of the operation done to the work as in the constructions previously described. In place of the tool heads 21 and 21a previously described, a tool head 80 is shown fixed to the forward end of the sleeve section 31. This tool head 80 is not provided with a transversely movable tool carrier, but instead has journaled therein a pair of shafts 81, each of which has fixed thereto a pinion 82 and a cutter 83. The cutters 83 are arranged as shown in Figure 12 in opposed relationship to each other, while the pinions 82 are arranged at opposite sides of the cutters 83 and mesh with the spiral gear teeth of a face gear 84. This face gear is secured to a hub member 85 pinned to the shaft 50 and for this purpose is shown as provided with a pair of locating pins 86 engaging in openings 87 in the member 85, and a pair of nuts 88 threaded on a reduced diameter portion 89 of the member 85 and engaging the forward face of an inwardly directed flange 90 of the face gear 84. With this arrangement the sleeve 30 must be given an axial motion to feed the cutters relative to the work, and the sleeve section 35, therefore, has sliding movement with respect to its driving quill 44, while the shaft 50 is keyed for axial motion relative to its holding member 69. A grooved collar 190 fixed to the sleeve section 31 and actuated by the lever 191 which may be swung by suitable cam mechanism (not shown) may be employed to produce this feeding motion. The specific construction of the tool head 80 and mounting shown herein is not per se a part of our invention and is therefore not claimed herein.

It will be understood that, as is customary in machines of the type illustrated, all the tooling operations done by the machine are performed before the work is cut off from the stock held within the work spindle, and that after the tooled work has been cut off, the stock is fed to present another portion into position to be tooled.

From the foregoing description of certain embodiments of this invention, it should be evident to those skilled in the art that various changes and modifications might be made therein without departing from the spirit or scope of this invention as defined by the appended claims.

We claim:

1. The combination with a rotary work spindle, a shaft arranged coaxial with said spindle, a sleeve journaled on said shaft, a tool head carried by said sleeve, a rotating means, positive driving connections from said rotating means to said spindle, positive driving connections from said rotating means to said sleeve rotating said sleeve in the same direction and at the same speed as said spindle, one of said driving connections including a coupling having angularly adjustable parts and means for securing said parts in angularly adjusted position, of means producing a differential speed between said sleeve and shaft, a rotary tool carried by said head for feeding motion relative thereto and with respect to work carried by said spindle, means actuated by said speed differential for rotating said tool, and means for feeding said tool.

2. The combination with a rotary work spindle, a shaft arranged coaxial with said spindle, a sleeve journaled on said shaft, a tool head carried by said sleeve, a rotating means, positive driving connections from said rotating means to said spindle, positive driving connections from said rotating means to said sleeve rotating said sleeve in the same direction and at the same speed as said spindle, one of said driving connections including a coupling having angularly adjustable parts and means for securing said parts in angularly adjusted position, of means for holding said shaft against rotation with said sleeve, a rotary tool carried by said head for feeding motion relative thereto and with respect to work carried by said spindle, means actuated by the difference in speed between said shaft and sleeve for rotating said tool, and means for feeding said tool.

3. The combination with an indexing work carrier, rotary spindles arranged in circular array in said carrier, means for indexing said work carrier from one to another tooling position, common means for rotating said spindles in fixed angular relationship, of a tool mounted to rotate coaxially with one of said spindles for operation on work rotating with said one spindle, means for driving said tool, and connections from said common rotating means for rotating said tool about said spindle axis at the same speed as said one spindle to maintain said tool and the work carried by said one spindle in the same angular relation to the axis of said spindle during the tooling operation, said connections including a transmission coupling having angularly adjustable drive and driven members and means for securing said members together in angularly adjusted positions, by the adjustment of which members the angular position of tooling about the axis of rotation of said one spindle may be brought into predetermined relation to machining operations performed on the same work at previous index positions of said work carrier.

4. The combination with a rotary work spindle, of a sleeve journaled coaxially with said spindle, said sleeve comprising a pair of alined sections, means for securing said sections together in adjustable angular relation, a shaft journaled within and coaxially with said sleeve, a tool head carried by one of said sleeve sections adjacent to the forward end of said work spindle, means for rotating said spindle and the other sleeve section at the same speed, a tool carrier movably supported by said head, a rotary tool carried by said carrier, means for holding said shaft against rotation with said sleeve, connections between said shaft and tool causing rotation of said head relative to said shaft to rotate said tool relative to said head, and means actuable to move said carrier relative to said head.

HENRY H. WELD.
WALLACE C. HILLIARD.